United States Patent [19]

Smith et al.

[11] 4,169,812
[45] Oct. 2, 1979

[54] REGENERATION OF SCALE-COATED ACTIVATED CARBON WITH ACID WASH

[75] Inventors: David W. Smith, East Windsor, N.J.; Marinus J. Baadsgaard, Henderson, Nev.

[73] Assignee: FMC Corporation, Philadelphia, Pa.

[21] Appl. No.: 884,108

[22] Filed: Mar. 7, 1978

[51] Int. Cl.² ............... B01J 21/20; C01D 7/26; B01D 15/06
[52] U.S. Cl. .................. 252/415; 252/413; 423/206 T; 423/421
[58] Field of Search ............ 252/415, 413, 421, 422; 423/206 T, 461, 460; 201/17

[56] References Cited

U.S. PATENT DOCUMENTS

| | | | |
|---|---|---|---|
| 43,748 | 8/1864 | Beanes | 252/413 |
| 239,962 | 4/1881 | Jennings | 252/420 |
| 1,502,896 | 7/1924 | Barneby | 252/421 |
| 3,260,567 | 7/1966 | Hellmerg | 423/206 T |
| 3,528,766 | 9/1970 | Cogliati, Jr. et al. | 423/206 T |
| 3,927,175 | 12/1975 | Garafano | 423/206 T |
| 3,933,977 | 1/1976 | Ilardi et al. | 423/206 T |

FOREIGN PATENT DOCUMENTS

| | | | |
|---|---|---|---|
| 596239 | 4/1960 | Canada | 252/413 |
| 536713 | 5/1941 | United Kingdom | 201/17 |

*Primary Examiner*—Winston A. Douglas
*Assistant Examiner*—P. E. Konopka
*Attorney, Agent, or Firm*—Christopher Egolf; Frank Ianno

[57] ABSTRACT

A method for regenerating scale-coated activated carbon used to treat crude sodium carbonate solutions in which the scale-coated carbon is acid washed with an aqueous solution containing from 1 to 15% by weight hydrochloric acid and from 0.5 to 3% by weight ammonium bifluoride.

14 Claims, No Drawings ized by various unit operations to remove inorganic and organic impurities. Activated carbon has been employed in this application to adsorb organic impurities from crude sodium carbonate solutions, as is described by Hellmers et al, U.S. Pat. No. 3,260,567, and Ilardi et al, U.S. Pat. No. 3,933,977. The activated carbon is typically contained in packed bed columns, through which the crude sodium carbonate process stream is passed. The carbon is periodically reactivated by washing with hot water or thermally, by contacting the spent carbon with steam, to regenerate the carbon adsorptivity.

REGENERATION OF SCALE-COATED ACTIVATED CARBON WITH ACID WASH

BACKGROUND OF THE INVENTION

1. Field of the Invention

This invention relates to the regeneration of scale-coated activated carbon. More particularly, an acid wash method is disclosed for removing mineral scale formed on activated carbon from the treatment of crude sodium carbonate solutions.

2. Description of the Prior Art

In the manufacture of soda ash (sodium carbonate) from trona ore, crude sodium carbonate process solutions are purified by various unit operations to remove inorganic and organic impurities. Activated carbon has been employed in this application to adsorb organic impurities from crude sodium carbonate solutions, as is described by Hellmers et al, U.S. Pat. No. 3,260,567, and Ilardi et al, U.S. Pat. No. 3,933,977. The activated carbon is typically contained in packed bed columns, through which the crude sodium carbonate process stream is passed. The carbon is periodically reactivated by washing with hot water or thermally, by contacting the spent carbon with steam, to regenerate the carbon adsorptivity.

A serious drawback associated with the use of activated carbon beds in this particular application is the gradual accumulation of inorganic mineral scale of heretofore unidentified composition on the carbon. Formation of the inorganic mineral scale on the activated carbon appears to be exacerbated with crude sodium carbonate solutions which are highly saturated with carbonate as well as calcium, silica, alumina, magnesium and other mineral components associated with trona ore.

A serious, undesirable consequence of the mineral scale formation on the activated carbon particles is the decrease in carbon activity resulting from the loss of adsorptive capacity of the carbon. In severe instances of such scaling, the activated carbon bed literally becomes cemented into a single mass by the scale, thereby impeding regeneration of the carbon.

Conventional methods of regenerating spend activated carbon are ineffective for carbon coated with such mineral scale. Periodic hot water washes or thermal regeneration with steam have been found ineffective for removing the inorganic scale from activated carbon and for regenerating the activity of the scale-coated carbon to an adequate level of carbon adsorptivity.

Coglaiti et al, in U.S. Pat. No. 3,528,766, recognize that a hot water wash alone is inadequate for reactivating scale-coated carbon used to treat sodium carbonate solution and suggest that a simple muriatic acid (HCl) rinse is sufficient for removing the mineral scale from activated carbon beds. Despite this disclosure by Coglaiti et al, washing with hydrochloric acid alone has not been found to be totally effective for removing scale from activated carbon which has been used to treat crude sodium carbonate solutions during the manufacture of soda ash and for regenerating spent carbon activity to a satisfactory level of adsorptivity.

Although hydrochloric acid washes may provide marginal regeneration for spent carbon with minor scaling, activated carbon used to treat crude sodium carbonate solutions over extended periods of time typically suffers a significant decline in its carbon activity that is not susceptible to regeneration even with periodic hydrochloric acid or hot water washes.

As a consequence, the scale-coated activated carbon must ultimately be discarded when scale deposition results in a severe loss of carbon adsorptivity.

SUMMARY OF THE INVENTION

In accordance with the present invention, scale-coated spent activated carbon used to treat crude sodium carbonate solutions is regenerated by washing the scale-coated carbon with an aqueous solution containing from 1 to 15% by weight hydrochloric acid and from 0.5 to 3% by weight ammonium bifluoride for a period of time sufficient to remove the scale from the carbon. The acid wash solution contains HCl and $NH_4HF_2$ in a weight ratio such that the relative amount of HCl is at least equal to that of $NH_4HF_2$ and preferably in a ratio of about 4 to 6 parts by weight HCl to 1 part by weight $NH_4HF_2$.

DETAILED DESCRIPTION

The acid wash solution employed in the method of the present invention contains from 1 to 15% by weight hydrochloric acid and 0.5 to 3% by weight ammonium bifluoride such that the relative amount by weight of HCl is at least equal to that of $NH_4HF_2$. The acid wash solution preferably contains 5 to 15% by weight HCl and 1 to 3% by weight ammonium bifluoride and most preferably contains 5 to 12% by weight HCl and 1 to 2% ammonium bifluoride. At these preferred concentrations, the HCl and $NH_4HF_2$ are desirably present in the acid wash solution in a weight ratio of about 4 to 6 parts HCl to 1 part $NH_4HF_2$.

The quantity of acid wash solution required to regenerate scale-coated activated carbon is not critical, being that amount which is sufficient to remove all visible traces of the whitish-appearing scale from the carbon surface, as viewed microscopically at a magnification of 5–100× preferably 10×. The actual quantity employed, of course, will depend on the degree of scaling on the spent carbon and may range from about 1 to 125 liters of acid wash solution per kilogram of spent carbon. The precise quantity is readily determinable by one familiar with activated carbon column regeneration techniques.

The temperature of the acid wash solution is not critical and may range from ambient, around 5° to 20° C., to about 100° C. At the higher temperatures, removal of the scale by the acid wash solution is more rapid and regeneration of the scale-coated carbon is therefore more efficient. The preferred temperature for the acid wash solution is between 15° to 35° C., and the exothermic heat of solution for dissolving the HCl and $NH_4HF_2$ into aqueous solution facilitates obtaining this desired temperature range for the solution.

Duration of the acid wash treatment, like the quantity of acid wash solution required, must be sufficient to dissolve and remove the scale from the carbon so as to remove all visible traces of the whitish-appearing scale from the carbon. This period may be as short as ¼–½ hour or as long as 2–3 days, depending on acid wash solution concentrations, degree of scaling on the carbon, washing temperatures and like factors. The preferred (higher) acid wash concentrations are desirable for minimizing the duration of the acid washing period.

Treatment of spent, scale-coated activated carbon according to the method of this invention will improve carbon activity by at least 15%, and often much more, over that for untreated spent, scale-coated carbon. The preferred concentrations of hydrochloric acid and ammonium bifluoride will improve the carbon adsorptivity of spent, scale-coated carbon by at least 20-25%. This improvement compares very favorably with washing with either hot water or concentrated hydrochloric acid, which typically results in a 5-10% improvement in carbon activity over that measured for the untreated scale-coated carbon.

For these comparisons of carbon activity, the adsorptivity of the activated carbon was measured by the iodine number, a measure of the amount of iodine adsorbed by the carbon from an aqueous iodine solution. The iodine number procedure used was Pittsburgh Activated Carbon Company Test Method TM 4, which measures the milligrams of iodine adsorbed by a one gram carbon sample from 100 ml of 0.10 N aqueous iodine solution. This determination is made by titrating the iodine remaining in solution with sodium thiosulfate, after the carbon sample has been removed by filtration. Because these iodine number data are used for relative comparisons only in this disclosure and because this analytical procedure is a standard method well known to those who use activated carbon, further detailed description of the iodine number determination is believed unnecessary.

A representative iodine number for virgin activated carbon is typically in excess of 1000, varying between 1000 to 1150. Such virgin carbon used to treat crude sodium carbonate process solutions over a period of time ranging between a few days to a month or more will accumulate a mineral scale coating that reduces the iodine number to below 800, typically around 600 to 750, which indicates unsatisfactory adsorptivity for the carbon. Regeneration of spent activated carbon is deemed very satisfactory when the iodine number of such regenerated carbon is restored to a value between 900 to 1000, where the virgin carbon iodine number was determined to be above 1000.

The preferred acid wash procedure, as applied to a commercial scale process operation, involves removing a portion of the mineral scale-coated carbon from the carbon columns for treatment in the method of this invention. Acid washing of the carbon columns with the scale-coated carbon in situ, an alternative to removal of the carbon from the columns, yields satisfactory results although it may involve the potential for corrosion of some column materials.

In the preferred acid wash procedure, the portion or slug of scale-coated carbon which is removed from the column for treatment is replaced with an equivalent amount of treated, regenerated activated carbon. Alternatively, all of the column carbon contents may be removed for treatment in a single acid washing operation. Continuous operation may be maintained in this alternative procedure by use of a bank of carbon columns in which at least one column is always operative.

The spent scale-coated carbon is desirably processed according to the method of this invention after first having been washed with water, preferably cold water at a temperature between 5° to 20° C., with agitation. The preferred agitated washing with cold water aids in removing any sodium carbonate deposits, especially sodium carbonate monohydrate, contained in the mineral scale and appears to facilitate rapid scale removal in the subsequent acid washing procedure of this invention.

Regardless of whether the carbon removed from the column is subjected to the optional cold water wash, the scale-coated carbon is then contacted with water which contains hydrochloric acid and ammonium bifluoride in sufficient amounts for the strength of the solution to be from 1 to 15% by weight HCl and 0.5 to 3% by weight $NH_4HF_2$ such that the weight ratio of HCl to $NH_4HF_2$ is at least 1:1. The ultimate strength of the acid wash solution is most preferably adjusted to about 5 to 12% HCl and 1 to 2% $NH_4HF_2$.

The hydrochloric acid is typically added in the preparation of the acid wash solution as a concentrated solution, around 35% by weight HCl. The ammonium bifluoride may be added either as a solid or a concentrated solution. The HCl and $NH_4HF_2$ may be added to the water separately or may be premixed before their addition to the water to form the acid wash solution. Alternatively, the desired concentrations of HCl and $NH_4HF_2$ in the acid wash solution may be obtained by the combination of HCl, HF and $NH_4Cl$ in suitable amounts, but this procedure involves the hazards inherent in handling HF.

In the preparation of the acid wash solution, the HCl and $NH_4HF_2$ are preferably added gradually to raise the strength of the acid wash solution to the desired concentrations of HCl and $NH_4HF_2$. During this addition period, the scale-coated carbon is contacted with the acid wash solution, which is circulated or agitated to assure intimate mixing of the scale-coated carbon granules with the acid wash solution. The circulation of the acid wash solution in contact with the scale-coated carbon should continue during the preferred gradual addition procedure at least until the desired acid concentration is reached. Sufficient additional time, if necessary, should then be provided for the complete removal of the whitish-appearing mineral scale from the carbon granules. The overall acid washing period including the time to prepare the full strength acid wash solution may be as short as a ¼-½ hour or may require 2-3 days, depending on the degree of scaling present on the carbon.

The preferred gradual addition of the hydrochloric acid and ammonium bifluoride components to prepare the acid wash solution avoids a rapid and potentially uncontrollably evolution of carbon dioxide gas, which may result from treating heavily scale-coated carbon at the outset with a full-strength acid wash solution.

An alternative to the preferred acid washing procedure is the gradual addition of the scale-coated carbon to the full strength acid washing solution. In this alternative procedure, which minimizes the possibility of uncontrolled $CO_2$ evolution, the gradual addition of the scale-coated carbon, a portion at a time, to the acid wash solution should be carried out with agitation of the carbon in the acid wash solution.

The acid wash treatment of this invention is optionally followed by a water wash, preferably hot water at a temperature above 85° C., to remove all traces of the acid wash solution from the treated carbon. The preferred hot water wash also serves to reactivate the treated carbon further. Thermal regeneration with steam may likewise be desirable, in some circumstances or on an occasional basis, for more fully restoring the activity of the acid-treated scale-free carbon to adsorptivity capacity approaching that of virgin carbon, i.e., over 1000. Inasmuch as the acid washing procedure of this invention renders the activated carbon scale-free, the treated carbon is therefore more susceptible to hot water or thermal regeneration.

Lack of knowledge in the prior art concerning the precise identity of the inorganic scale that accumulates on activated carbon employed in the treatment of crude sodium carbonate solutions has been a significant factor in the difficulties encountered in treating the scale by conventional techniques. In connection with the acid washing technique of this invention, it has been discovered that the whitish-appearing scale consists primarily of two minerals which are apparently found in small amounts in the trona ore from which the crude sodium carbonate solutions are prepared. Chemical and x-ray diffraction analyses of the scale on carbon samples have revealed that its chief constituents are pirsonnite, $Na_2CO_3 \cdot CaCO_3 \cdot 2H_2O$, and analcite, $Na_2O \cdot Al_2O_3 \cdot 4SiO_2 \cdot 2H_2O$.

Other mineral species have also been detected as being present in the scale: sodium carbonate monohydrate, dolomite ($CaMg(CO_3)_2$), calcite ($CaCO_3$), α-quartz (a form of $SiO_2$) and montmorillonite clay $(Mg, Ca)O \cdot Al_2O_3 \cdot 5SiO_2 \cdot nH_2O$.

In the operation of a carbon column being used to remove organic impurities from crude sodium carbonate solutions, the pirsonnite-analcite scale becomes deposited on the individual granules of activated carbon, giving a whitish appearance to the carbon. If not treated, the scale deposit continues to accumulate, with the analcite appearing to act as the binding component in the scale, and eventually results in individual carbon granules becoming fused together into a solid mass. Analcite crystals tend to be find-grained, forming semicontinuous masses which completely fill the spaces between carbon granules. Pirsonnite crystals tend to seed on the carbon granules and grow outwardly from there, becoming fused to one another as well as being incorporated into the analcite matrix.

A further complication to the mineral scale problem is that the analcite-pirsonnite scale tends to trap and incorporate solids contained in the crude sodium carbonate solution, such as trona ore insolubles, filter aid particles, abraded carbon fines and flocculated materials. Dolomite and α-quartz are insoluble particulate minerals ($\leq 5$ μm in diameter) in the crude sodium carbonate solution that appear to escape being filtered in the unit operations (clarification, filtration) that precede the carbon treatment step and are thus trapped in the scale that is deposited on the carbon granules.

The effectiveness of the acid wash method of the present invention in regenerating the adsorptivity of the mineral scale-coated carbon is demonstrated by the following comparison of various prior art treatments for regenerating spent carbon against the present method for removing scale from spent carbon which has been employed to remove organic impurities from crude sodium carbonate process solutions.

EXAMPLE

The scale-coated, spent activated carbon used in the following washing tests was obtained from FMC Corporation's Green River, Wyo. soda ash facility. The granular scale-coated carbon was taken from carbon columns which had been used to treat clarified sodium carbonate solution in a monohydrate process soda ash plant over a period of several weeks. The spent, scale-coated carbon had previously been washed with hot water but had not been regenerated immediately prior to these tests.

Each test was performed in a 300 ml polyethylene beaker to which a 5 gram sample of the spent, scale-coated carbon had been added. Two hundred milliliters of wash solution (described below) was added to the beaker and the mixture stirred for between 30–60 minutes to ensure complete reaction with no diffusion control of the reaction.

The carbon was then separated from the wash solution by filtration and washed with three volumes, 200 ml each, of hot (T=90° C.) distilled water. The carbon sample was then dried and analyzed for adsorptivity as indicated by the iodine number. The ash content of the dried carbon was also determined, this parameter being a measure of the incombustible, inorganic content of the carbon and thus being indicative of the degree of scale removal.

The Table summarizes data for three comparative wash solutions (cold water, hot water and concentrated hydrochloric acid) and for several acid wash solutions exemplifying the method of the present invention.

The temperature of the cold water wash was between 18°–23° C., and the temperature of the hot water wash was between 85°–95° C. The concentrated hydrochloric acid had a concentration of approximately 37% by weight and had a temperature of about 18°–23° C.

In the acid wash solutions exemplifying the method of this invention, hydrochloric acid-ammonium bifluoride concentrations ranged between 1% HCl–½% $NH_4HF_2$ to 10% HCl–2% $NH_4HF_2$. The temperature of all these acid wash solutions was between 18°–25° C.

The Table also contains data for representative unwashed, scale-coated plant carbon (i.e., the spent carbon employed in these wash tests) and virgin activated carbon (unused granular activated carbon supplied by Pittsburgh Activated Carbon Co.). Both iodine number, a measure of carbon adsorptivity, and percentage ash content, a measure of inorganics contained in the carbon, are shown in the Table.

The data in the Table show that cold water (T=18°–23° C.) washing appears preferable to hot water (T=85°–95° C.) washing, insofar as iodine number is used as a basis for comparison. Cold water is believed to decompose the pirsonnite to calcite, whereas hot water decomposes the pirsonnite to a finer-grained form of calcium carbonate, aragonite. Calcite, rather than aragonite, appears to be more readily removed from the carbon surface, along with some of the trapped analcite, via the mildly abrasive action of the water in the water wash and in the subsequent acid wash treatment. The cold water wash, which decomposes pirsonnite into calcite, therefore yields a higher iodine number than the the hot water wash of the untreated, scale-coated carbon.

The concentrated hydrochloric acid wash yields somewhat better results than water washing but has been found insufficient to remove all of the scale from the carbon surface. The siliceous component of the scale, analcite, is resistant to attack by weak acids. Strong acids, such as concentrated HCl, appear to decompose the analcite to silica gels which are also resistant to conventional chemical removal techniques. Thus, neither water washes nor concentrated hydrochloric acid washes are completely satisfactory for removing the mineral scale from spent carbon.

The data demonstrate that the hydrochloric acid-ammonium bifluoride acid wash solution employed in the method of the present invention is clearly the most efficient means for improving the adsorptivity (iodine number) and minimizing the ash value of the treated, activated carbon. In all of the trials shown in the Table, the HCl-NH$_4$HF$_2$ wash was preceded by a cold water wash. The most preferred concentration range of 5–12% HCl and 1–2% NH$_4$HF$_2$ yielded the best results, as evidenced by the tabulated data for the last two wash tests (5% HCl–1% NH$_4$HF$_2$ and 10% HCl–2% NH$_4$HF$_2$).

The 15% upper limit for HCl concentration in the method of this invention is dictated by the economics of commercial operation, rather than inoperability of such concentrated acid wash solutions. Furthermore, the high acid wash concentrations do not appear to regenerate the spent, scale-coated carbon to higher adsorptivities (iodine numbers) than obtained with the preferred acid wash concentrations.

The acid wash tests exemplifying this invention resulted in the removal of the whitish-appearing scale from the carbon surface, as determined by visual inspection of the treated carbon. Microscopic examination of the treated carbon at magnifications between 10–100× indicated a degree of scale removal that was consistent with iodine numbers and ash content data reported in the Table.

TABLE

| | Wash Solution | Iodine No. | Ash %, By Weight |
|---|---|---|---|
| None | (Virgin Activated Carbon) | 1143 | 4.7 |
| None | (Scale-Coated, Spent Carbon) | 760 | 11.9 |
| | Cold Water (T = 18°–23° C.) | 810 | 8.5 |
| | Hot Water (T = 85°–95° C.) | 790 | 7.9 |
| | Concentrated (37% by wt.) HCl | 837 | 5.0 |
| | Cold Water; 1% HCl + ½% NH$_4$FHF | 893 | 4.4 |
| | Cold Water; 2% HCl + 1% NH$_4$FHF | 917 | 3.4 |
| | Cold Water; 2% HCl + 2% NH$_4$FHF | 920 | 1.2 |
| | Cold Water; 3% HCl + ½% NH$_4$FHF | 872 | 1.3 |
| | Cold Water; 3% HCl + 1% NH$_4$FHF | 888 | 0.7 |
| | Cold Water; 5% HCl + 1% NH$_4$FHF | 937 | 0.5 |
| | Cold Water; 10% HCl + 2% NH$_4$FHF | 912 | 0.5 |

What is claimed is:

1. A method for regenerating scale-coated activated carbon used to treat sodium carbonate solutions which comprises
washing the scale-coated carbon with an aqueous acid wash solution containing from 1 to 15% by weight HCl and from 0.5 to 3% by weight NH$_4$HF$_2$, provided that the weight ratio of HCl to NH$_4$HF$_2$ in the solution is at least 1.

2. The method of claim 1 wherein the acid wash solution contains from 5 to 15% by weight HCl and from 1 to 3% by weight NH$_4$HF$_2$.

3. The method of claim 1 wherein the acid wash solution contains from about 5 to 12% by weight HCl and from 1 to 2% by weight NH$_4$HF$_2$.

4. The method of claim 1 wherein the ratio of HCl to NH$_4$HF$_2$ is about 4 to 6 parts by weight HCl to 1 part by weight NH$_4$HF$_2$.

5. The method of claim 1 wherein the acid wash solution is maintained at a temperature between 5° C. and 100° C.

6. The method of claim 1 wherein the acid wash solution is maintained at a temperature between 15° C. and 35° C.

7. The method of claim 1 which comprises washing the scale-coated carbon for a period of time sufficient to remove all traces of the whitish-appearing scale microscopically visible to a magnification of 10×.

8. The method of claim 1 which comprises washing the scale-coated carbon with about 1 to 125 liters of acid wash solution per kilogram of carbon.

9. The method of claim 1 which comprises washing the scale-coated carbon for a period of time from 15 minutes to 2 days.

10. The method of claim 1, wherein the carbon activity of spent, scale-coated carbon having an iodine number less than 800 is increased by at least 15%, as measured by the iodine adsorptivity.

11. The method of claim 1 which comprises washing the scale-coated carbon with cold water at a temperature between 5° to 20° C. prior to the acid washing.

12. The method of claim 1 which comprises washing the scale-coated carbon with hot water at a temperature above 85° C. prior to the acid washing.

13. The method of claim 1 which comprises washing the acid-washed carbon with hot water at a temperature above 85° C. to remove all traces of the acid wash solution and to regenerate the carbon adsorptivity further.

14. The method of claim 1 which comprises thermally regenerating the acid washed carbon with steam.

* * * * *